March 3, 1970   A. R. CANONICO ET AL   3,498,679
APPARATUS FOR AND METHOD OF REMOVING DRY BALLAST
FROM A PNEUMATIC TIRE
Filed July 7, 1966   3 Sheets-Sheet 1
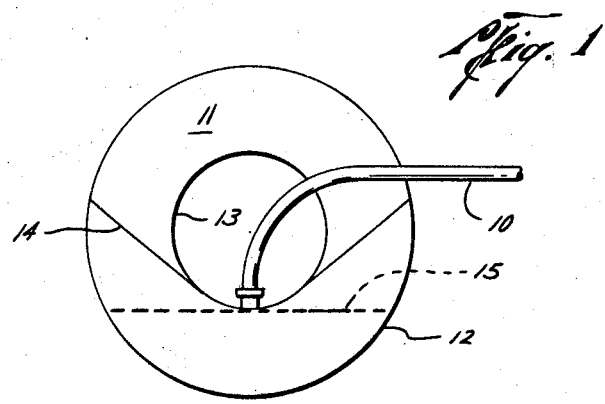
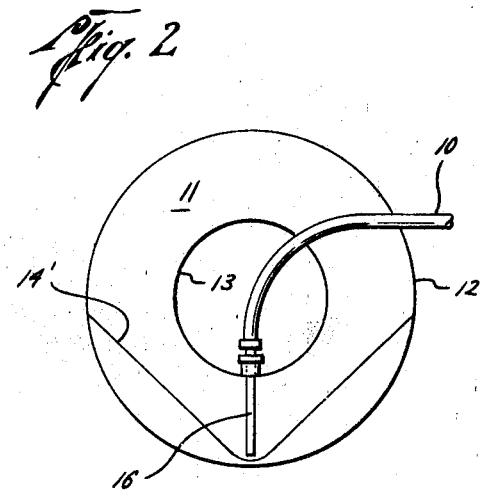
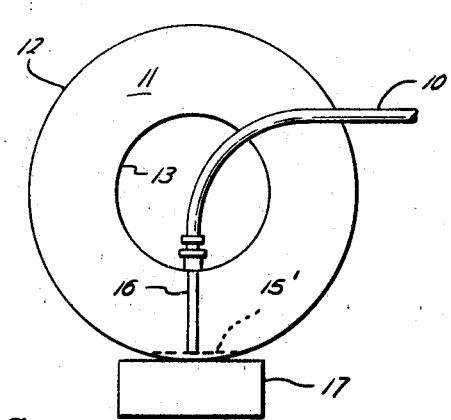
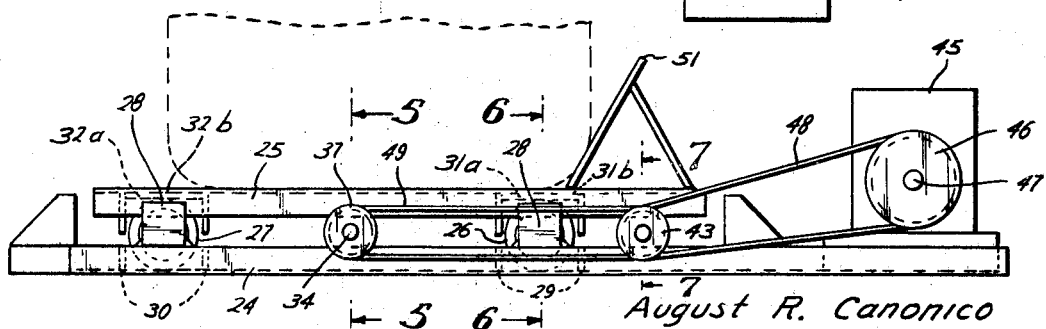
August R. Canonico
William B. Brown
INVENTORS
BY
*Browning, Simms, Hyer & Eichenacht*
ATTORNEYS

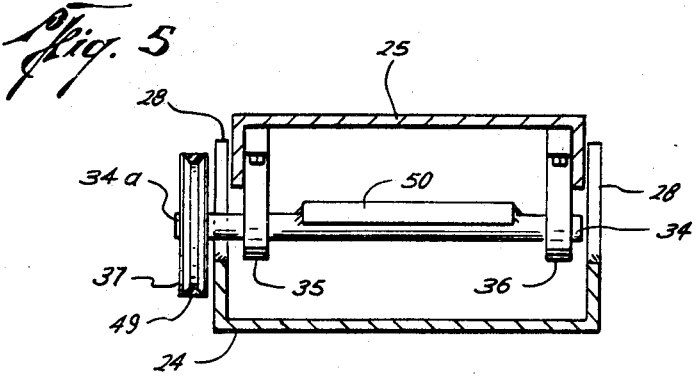
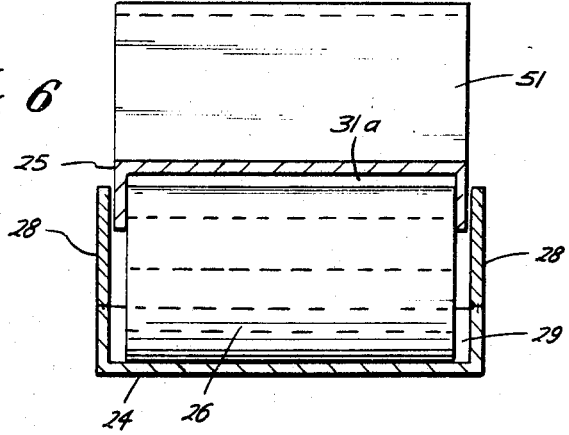
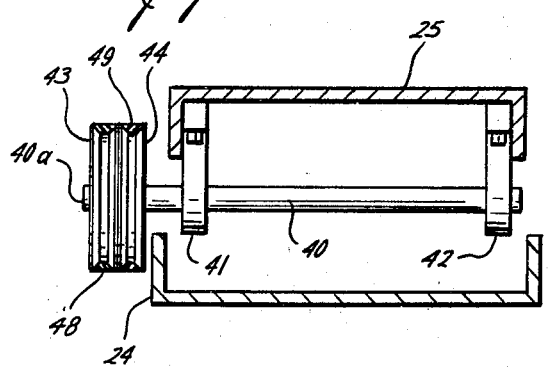
August R. Canonico
William B. Brown
INVENTORS

March 3, 1970 A. R. CANONICO ET AL 3,498,679
APPARATUS FOR AND METHOD OF REMOVING DRY BALLAST
FROM A PNEUMATIC TIRE
Filed July 7, 1966 3 Sheets-Sheet 3
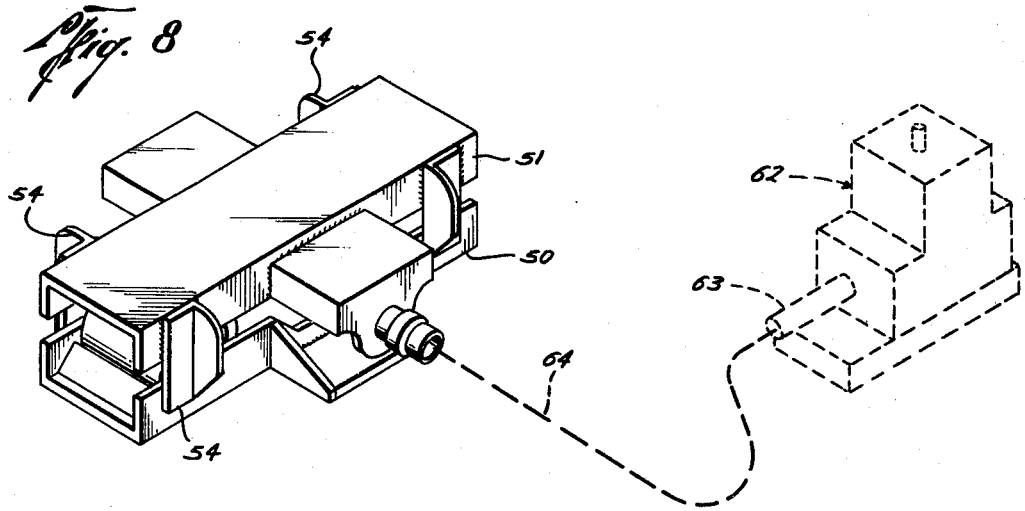
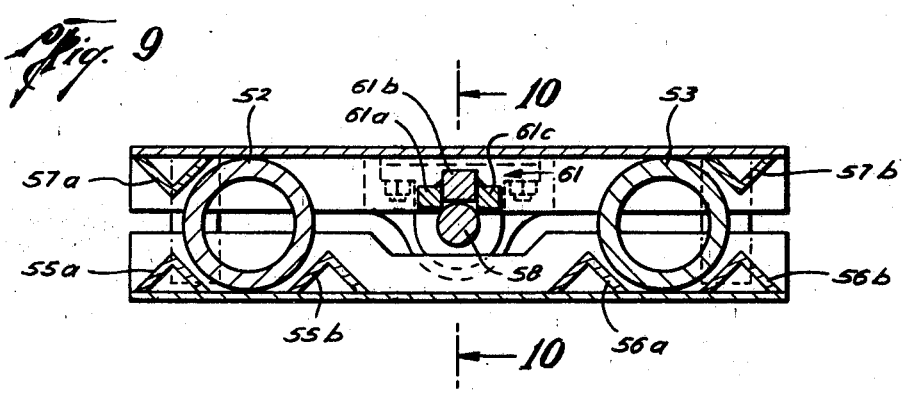
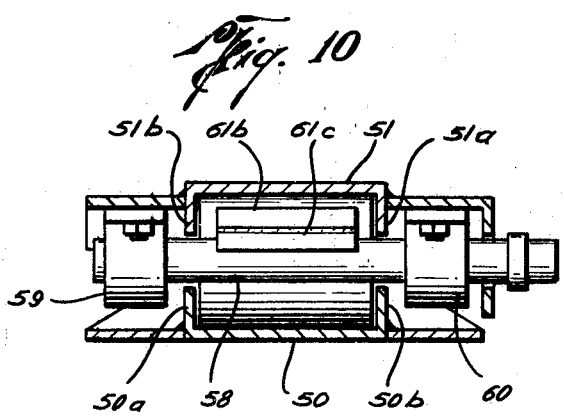
August R. Canonico
William B. Brown
INVENTORS
BY
*Browning, Simmons, Hoyer & Eisbrandt*
ATTORNEYS United States Patent Office 3,498,679
Patented Mar. 3, 1970

3,498,679
APPARATUS FOR AND METHOD OF REMOVING DRY BALLAST FROM A PNEUMATIC TIRE
August R. Canonico and William B. Brown, Houston, Tex., assignors, by mesne assignments, to Dry Ballast, Inc., Houston, Tex., a corporation of Texas
Filed July 7, 1966, Ser. No. 563,588
Int. Cl. B65g 53/40
U.S. Cl. 302—56                    9 Claims

ABSTRACT OF THE DISCLOSURE

The invention provides means, including a platform and means to support same for oscillatory, vibratory motion so that a large size vehicle tire containing dry ballast may be disposed on the platform and thus moved and vibrated whereby an eductor tube connected outwardly to a solids removal pump may have its inner end insertable into the tire to follow the descending level of granular ballast therein to substantially the bottom of the tire, as the vibration and oscillation of the platform keeps the upper surface of the ballast continuously substantially level in descent.

---

This invention relates generally to removing dry ballast from a pneumatic tire, and, in particular, to apparatus for and a method of removing such dry ballast from the tire before the tire is dismounted from the rim of the wheel upon which it is mounted.

Dry ballast, such as powdered barium sulfate, is placed in the tires of vehicles to increase the traction between the tires and the ground. When it is necessary to replace or repair a tire containing this dry ballast, it is desirable to remove as much of this ballast as possible before the tire is dismounted from the rim. This allows the service man to handle the tire and the tire tube, if the tire is of the tube type, without having to also handle the added weight of the dry ballast.

It has been the practice in the past to unload such ballast by inserting a tube or conduit into the sealed cavity of the tire casing in which the ballast is located and creating a pressure differential between the conduit and the sealed cavity. This pressure differential causes the dry powdered ballast to be blown out of the cavity through the eductor conduit. The eductor conduit is located as low as possible in the cavity so as to remove as much as possible of the ballast. This system often leaves a substantial amount of ballast in the tire. For as the surface of the ballast drops toward the level of the lower end of the eductor tube, it becomes shaped like an inverted cone and when the apex of the cone reaches the lower end of the eductor tube and the angle of its sides equal the angle of repose of the ballast material, little more, if any of the ballast flows down toward the tube to be ejected from the tire.

Therefore, it is an object of this invention to provide apparatus for and a method of removing dry ballast from the sealed cavity of the casing of a pneumatic tire mounted on a rim which will maintain the upper surface of the dry ballast substantially horizontal as the ballast is forced to flow from the cavity through an eductor tube or conduit.

It is another object of this invention to provide apparatus for and a method of removing through an eductor tube, extending into the sealed cavity of a tire casing, the maximum possible amount of ballast for the particular position of the eductor conduit.

It is another object of this invention to provide a novel vibrator for placing under a tire mounted on a rim for vibrating the tire, while dry ballast is being removed from the sealed cavity of the tire through an eductor conduit, to cause the upper level of the dry ballast to remain substantially horizontal as it drops in the tire.

It is another object of this invention to provide a vibrator for vibrating a pneumatic tire while dry ballast is being removed therefrom that provides at least partial support for the weight of the tire, the rim etc.

It is another object of this invention to provide a vibrator for vibrating a pneumatic tire while dry ballast is being removed therefrom that provides a firm, non-resilient base for supporting at least a portion of the weight of the tire and the rim upon which it is mounted and which imparts vibrations in the tire principally in a direction parallel to the axis of rotation of the tire, i.e., parallel to the axis of an axle upon which it is adapted to be mounted.

These and other objects, advantages, and features of this invention will be apparent to those skilled in the art from a consideration of this specification and attached drawings.

The method and apparatus of this invention will now be described in detail in connection with the attached drawings in which, FIGURE 1 is a schematic cross sectional view taken along the longitudinal axis of a pneumatic tire to illustrate the difference in the amount of dry ballast removed by the previously employed method and apparatus and that removed by the apparatus and method of this invention for a given position of the eductor tube;

FIGURE 2 and FIGURE 3 are similar to FIGURE 1 and illustrate the difference in the amount of dry ballast removed by the previously employed system and the method and apparatus of this invention for another position of the eductor tube in the ballast containing cavity of a tire;

FIGURE 4 is a side view, in elevation, of one embodiment of the tire vibrator of this invention in position under a tire to vibrate the tire during the removal of the dry ballast therefrom;

FIGURE 5 is a sectional view taken along line 5—5 of FIGURE 4;

FIGURE 6 is a sectional view taken along line 6—6 of FIGURE 4;

FIGURE 7 is a sectional view taken along line 7—7 of FIGURE 4;

FIGURE 8 is an isometric view of the preferred embodiment of the vibrator of this invention showing in dotted lines the power source and flexible drive shaft used to operate this embodiment;

FIGURE 9 is a longitudinal vertical cross-section of the vibrator of FIGURE 8; and FIGURE 10 is a cross-sectional view taken along line 10—10 of FIGURE 9.

In FIGURE 1, eductor tube or conduit 10 has one end connected to sealed cavity 11 of tire 12 at the lowest point along rim 13. The sealed cavity may be a tube or in the case of a tubeless tire, the tire casing itself. As the dry ballast is removed through the eductor conduit, upper surface 14 thereof will take the shape of an inverted cone having sides sloping upwardly at an angle equal to the angle of repose of the particular material used as the ballast. Dotted line 15 illustrates the level to which the dry ballast can be removed employing the apparatus and method of this invention for this position of the eductor tube.

In FIGURE 1, the end of the eductor tube is located just below the lowest point on rim 13. In FIGURE 2, it is provided with extension 16, the lower end of which is located adjacent the lowermost point of cavity 11. With the previously employed system, the upper surface 14′ of the dry ballast would be as shown in FIGURE 2 when the maximum amount of ballast has been removed. Thus, a substantial portion of the material would be left in the tire.

FIGURE 3 illustrates schematically the apparatus of this invention, which, in addition to eductor conduit 10, employs vibrator 17 to vibrate the tire as the dry ballast is being removed therefrom. By vibrating the tire, which vibration is also imparted to the dry ballast, the ballast will not pile up at an angle extending upwardly from the lower end of the eductor conduit, but will maintain a substantially level upper surface. Thus, when the ballast level has dropped to where no more ballast can be picked up by the eductor conduit, as indicated by dotted line 15' in FIGURE 3, considerably more ballast will have been removed from the tire in FIGURE 2, with the eductor conduit located in the same place.

FIGURE 4 illustrates an embodiment of vibrator 17. It includes elongated base 24 and platform 25. Both the base and the platform are fabricated from channels. As shown in FIGURES 5–7, the base is positioned with its flanges extending upwardly and the platform is positioned with its flanges extending downwardly toward the base.

Means are provided to support the platform above the base and to permit movement of the platform relative to and parallel to the base. In the embodiment shown, rollers 26 and 27 are positioned between the platform and the base for that purpose. The rollers are limited in their movement laterally of the platform and the base by the downwardly extending flanges of the platform. To limit the lateral movement of the platform relative to the base, the base is provided with a plurality of spaced side members 28. These members are connected to the upwardly extending flanges of the base and extend along side of the downwardly extending flanges on the platform. The widths of the platform, the base, and the side members are arranged to allow very little lateral movement of the platform and the rollers relative to the base. The rollers are held in position longitudinally relative to the base by two pairs 29 and 30 of members. The members of each pair extend laterally across between the flanges on the base on either side of one of the rollers.

Means are also provided to limit the longitudinal movement of the platform parallel to the base. In the embodiment shown, angles 31a, 31b, 32a and 32b are attached to the platform with a flange of each angle extending downwardly along side one of the rollers and parallel to the longitudinal axis of the roller. The downwardly extending flanges are spaced from the roller to allow limited longitudinal movement of the platform relative to the rollers.

Means are provided to vibrate the platform. In the embodiment shown, shaft 34 is rotatably mounted on bearings (not shown) located in bearing housings 35 and 36. The bearing housings are mounted on the underside of platform 25, as shown in FIGURE 5. The shaft extends transversely of the platform. End portion 34a of the shaft projects laterally beyond base 24. Sheave 37 is mounted on the shaft and held against rotation relative thereto in any convenient manner.

Shaft 34 is mounted approximately midway between the ends of the platform. Spaced from shaft 34 and adjacent one of the ends of the platform is shaft 40. This shaft extends transverse the platform parallel to shaft 34. It is rotatably mounted below the platform in bearings (not shown) that are supported in bearing housings 41 and 42. As shown in FIGURE 7, the bearing housings are attached to platform 25. Sheaves 43 and 44 are mounted on end portion 40a of the shaft and held against rotation relative to the shaft in any convenient manner.

To rotate the shafts, power means 45, such as an electric motor or a small internal combustion engine, is mounted on base 24 as shown in FIGURE 4. Sheave 46 is mounted on the output shaft 47 of the power means and connected to sheave 43 through belt 48. Sheave 44, in turn, drives sheave 37 and shaft 34 through belt 49.

To produce vibration in the platform, eccentric, unbalanced, weight 50 is attached to the side of shaft 34. Thus, as the shaft is rotated, the eccentric weight exerts unbalanced forces on the platform through the shaft. These forces will rapidly reverse in their direction and cause the platform to vibrate. The frequency of vibration will depend upon the speed of rotation of the shaft.

In operation, the vibrator just described is placed under the tire to be emptied of dry ballast. The tire is positioned on platform 25 as shown by the dotted lines in FIGURE 4. To help properly position the platform under the tire, a positioning plate, such as plate 51, can be attached to the platform to limit the distance the vibrator can be inserted under the tire.

Usually, the wheel upon which the tire is mounted will be attached to a vehicle. Therefore, the wheel is first jacked off the ground in the normal manner. The vibrator is placed beneath the wheel at its lowest point and generally parallel to the axle upon which the wheel is mounted. The wheel is then lowered by the jack into engagement with the platform of the vibrator. The amount of vibration induced in the wheel will depend upon the force exerted on the platform by the wheel for any given vibrator construction. In practice it has been found that the proper force can best be determined by lowering the tire onto the platform, starting the vibrator, and determining if the desired vibrations are produced. If too little weight is exerted on the platform by the tire, the vibrator will tend to work itself out from under the tire. If too great a force is exerted on the platform by the tire, then insufficient vibration will be produced for the desired purposes.

With the tire exerting the proper force on the platform, power means 45 can be started and vibrations set up in the tire. Concomitantly, a pressure differential is established between the sealed cavity of the tire and the eductor tube, either by applying air pressure to the sealed chamber of the tire casing or by pulling a vacuum on the conduit. Either will start the ballast flowing through the eductor conduit out of the tire and into a storage bin. Obviously, the lower end of the eductor conduit can be located in the chamber containing the dry ballast, the more ballast can be removed therefrom.

FIGURES 8 through 10 show the preferred embodiment of the vibrator of this invention. It includes base 50 and platform 51. As shown in FIGURE 10, both the base and the platform are made of channels, arranged with their flanges extending toward each other. Thus flanges 51a and 51b of the platform extend toward flanges 50a and 50b of the base.

Means are provided to support the platform above the base and to permit movement of the platform relative to and parallel to the base. As in the embodiment previously described, rollers 52 and 53 are positioned between the base and the platform to hold the platform a predetermined distance above the base, to transmit the load on the platform to the base, and to allow the platform to move longitudinally in a direction parallel to the base. The rollers are positioned with their longitudinal axes extending transverse the longitudinal axis of the base and the platform. They are located between the downwardly and upwardly extending flanges on the base and platform so that they cannot move laterally relative to the base and, in turn, hold the platform against lateral movement relative to the rollers and the base. Also preventing lateral movement of the platform relative to the base are bars 54. These bars are made from angles and are welded to the platform, two bars to the side in the embodiment shown, and extend downwardly along the outside of flanges 50a and 50b of the base.

Means are provided to limit the distance rollers 52 and 53 can roll longitudinally along the base. As shown in FIGURE 9, angles 55a and 55b extend between the flanges of the base on opposite sides of rollers 52 and angles 56a and 56b are arranged in the same manner with respect to roller 53. The distance the angles of each pair are spaced apart determines the distance the rollers can roll along the base. Preferably, the distance each roller can roll is substantially equal. The distance the platform can move relative to the rollers is limited by angles 57a and 57b. These angles are located as shown in FIGURE 9.

Means are provided to vibrate the platform. In this embodiment, shaft 58 is rotatably mounted on platform 51 by bearing assemblies 59 and 60. The shaft extends transverse the longitudinal axis of the platform between the platform and the base. It is provided with an eccentrically mounted unbalanced weight assembly 61, which will cause the platform to vibrate as the shaft is rotated. The eccentric weight assembly in this embodiment comprises three relatively short pieces of square stock 61a, 61b and 61c, which are welded on one side of shaft 58, as shown in FIGURE 9.

Means comprising a power source and a flexible power transmitting connection between the power source and the shaft are provided to rotate the shaft with the unbalanced weight attached to it to vibrate the platform. In the embodiment shown, the power source is internal combustion engine 62 having output shaft 63. The output shaft is connected to shaft 58 of the vibrator through flexible drive shaft 64. This allows the engine to operate without being subjected to the vibrations produced by the vibrator. Also, it reduces considerably the weight of the vibrator over the embodiment shown in FIGURES 4 through 8 allowing it to be located under the tire, etc., with considerably less effort.

The vibrator of FIGURES 8–10 is used to help remove dry ballast from a pneumatic tire in the manner described above in connection with the vibrator of FIGURES 4–7.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for removing dry ballast from a pneumatic tire having a casing with a sealed chamber mounted on a rim, said dry ballast being located in the sealed chamber, the apparatus comprising an eductor conduit through which the ballast can flow having one end in communication with the sealed chamber below the level of the dry ballast therein, means for creating a pressure differential between the conduit and the sealed chamber to cause the ballast to flow from the chamber into the eductor conduit, and means for vibrating the tire to keep the upper surface of the dry ballast substantially level and comprising a base for positioning under the tire, a platform located between the tire and the base for engaging the tire, and for supporting at least a portion of the weight of the tire, means for supporting the platform above the base for movement and for transmitting the force exerted on the platform by the tire to the base, means carried by the base for limiting the distance the platform can move, and means for vibrating the platform to vibrate the tire, whereby substantially all of the dry ballast above the level of the end of the eductor tube will be removed from the tire.

2. The apparatus of claim 1 in which the means for supporting the platform above the base comprises a plurality of rollers positioned between the base and the platform to rollingly support the platform for lateral movement relative to the base while holding the platform spaced from the base.

3. A vibrator for vibrating a pneumatic tire having a casing with a sealed chamber mounted on a rim while removing dry ballast from the sealed chamber through an eductor tube connected to the chamber, comprising a base for positioning under the tire, a platform located between the tire and the base for engaging the tire and for supporting at least a portion of its weight, means for supporting the platform above the base for movement and for transmitting the force exerted on the platform by the tire to the base, means carried by the base for limiting the distance the platform can move, and means for vibrating the platform to vibrate the tire.

4. The vibrator of claim 3 in which the means for supporting the platform above the base comprises a plurality of rollers positioned between the base and the platform to rollingly support the platform for lateral movement relative to the base while holding the platform spaced from the base.

5. The vibrator of claim 4 in which the means for vibrating the platform comprises a shaft, means rotatably mounting the shaft on the platform between the platform and the base, an unbalanced weight attached to one side of the shaft, and means for rotating the shaft to cause the platform to vibrate.

6. The vibrator of claim 5 in which the means for rotating the shaft with the unbalanced weight comprises a power source and a flexible power transmitting connection between the power source and the shaft.

7. The vibrator of claim 6 in which the power source is an internal combustion engine having a rotating output shaft and the flexible power transmitting connection is a flexible drive shaft having one end connected to the output shaft of the engine and the other end connected to the shaft with the unbalanced weight.

8. A method of removing dry ballast from a pneumatic tire having a casing with a sealed chamber mounted on the rim of a wheel mounted on the axle of a vehicle, said dry ballast being located in the sealed chamber, said method comprising, raising the wheel and tire off the ground, placing a vibrating platform below the tire, lowering the tire until the tire is exerting a sufficient force on the platform for the vibrations of the platform to vibrate the tire sufficiently for the upper surface of the dry ballast therein to remain level as the dry ballast is removed, connecting an eductor conduit to the sealed chamber below the upper level of the dry ballast, and creating a pressure differential between the sealed chamber and the eductor conduit to cause the ballast to flow out of the chamber through the conduit.

9. A method of removing dry ballast from a pneumatic tire having a mounted casing with a sealed chamber mounted on the rim of a wheel, said dry ballast being located in the sealed chamber, said method comprising the steps of inserting an eductor conduit into the sealed chamber below the upper level of the dry ballast, creating a pressure differential between the sealed chamber and the eductor conduit to cause the dry ballast to flow from the sealed chamber through the eductor conduit, and vibrating the tire casing mounting continuously to cause the upper level of the dry ballast to remain substantially horizontal as it is lowered by the removal of dry ballast through the eductor conduit.

References Cited

UNITED STATES PATENTS

| | | | |
|---|---|---|---|
| 2,950,146 | 8/1960 | Lease et al. | 302—58 |
| 3,062,590 | 11/1962 | Turner et al. | 302—58 |
| 3,097,017 | 7/1963 | Turner et al. | 302—58 |

ANDRES H. NIELSEN, Primary Examiner

U.S. Cl. X.R.

302—58